United States Patent
Kamura et al.

[11] Patent Number: 6,003,489
[45] Date of Patent: Dec. 21, 1999

[54] FUEL INJECTION CONTROL DEVICE OF IN-CYLINDER TYPE INTERNAL COMBUSTION ENGINE

[75] Inventors: Hitoshi Kamura, Okazaki; Atsuyoshi Kojima, Toyota; Hiroki Tamura, Hoi-gun, all of Japan

[73] Assignee: Mitsubishi Jidosha Kogyo Kabushiki Kaisha, Tokyo, Japan

[21] Appl. No.: 09/069,820

[22] Filed: Apr. 30, 1998

[30] Foreign Application Priority Data

Apr. 30, 1997 [JP] Japan ............................... 9112872

[51] Int. Cl.$^6$ ............................... F02B 5/00; F02D 41/12
[52] U.S. Cl. ............................... 123/305; 123/675
[58] Field of Search ............................... 123/305, 276, 123/675, 436, 680, 679, 682

[56] References Cited

U.S. PATENT DOCUMENTS

| | | | |
|---|---|---|---|
| 5,009,210 | 4/1991 | Nakagawa et al. | 123/489 |
| 5,427,082 | 6/1995 | Thomas et al. | 123/675 |
| 5,722,363 | 3/1998 | Iida et al. | 123/305 |
| 5,738,074 | 4/1998 | Makamura et al. | 123/305 |

FOREIGN PATENT DOCUMENTS

| | | |
|---|---|---|
| 5-79370 | 3/1993 | Japan . |
| 7-279729 | 10/1995 | Japan . |
| WO96 036801 | 11/1996 | WIPO . |

*Primary Examiner*—Tony M. Argenbright
*Assistant Examiner*—Arnold Castro

[57] ABSTRACT

In an in-cylinder injection internal combustion engine which is placed in a selected one of a compression stroke injection mode in which fuel injection is conducted during a compression stroke, and a suction stroke injection mode in which fuel injection is conducted during a suction stroke, depending upon operating conditions of the engine, a fuel control device cut a fuel to be supplied to a combustion chamber of the engine when a certain fuel cut condition set depending upon the operating conditions of the engine is established, and resumes fuel injection in a compression stroke injection mode when a predetermined fuel cut return condition is established. In this fuel control device, when the fully closed state of a throttle valve is detected by an idle switch, or the engine speed is reduced by a large degree, the fuel injection is resumed in an intake stroke injection mode upon return from the fuel cut, so as to prevent undershoot of the engine speed.

8 Claims, 8 Drawing Sheets

FUEL INJECTION CONTROL DEVICE OF IN-CYLINDER TYPE INTERNAL COMBUSTION ENGINE

FIELD OF THE INVENTION

The present invention relates to a fuel injection control device of an in-cylinder injection type internal combustion engine, wherein a fuel is directly injected into a cylinder of the engine.

BACKGROUND OF THE INVENTION

In recent years, in-cylinder or direct injection type internal engines have been developed as internal combustion engines for motor vehicles. In this type of in-cylinder injection type engine, fuel is directly injected into a cylinder, or a combustion chamber, of the engine, and therefore various devices have been employed for forming a fuel-air mixture having an air fuel ratio close to the stoichiometric ratio, only in the vicinity of a spark plug provided in the cylinder. In the in-cylinder injection type engine equipped with such a device, the fuel can be fired or ignited without fail and burned well, even if the fuel-air mixture in the cylinder as a whole is a lean fuel mixture, namely, even if the average air fuel ratio is greater than the stoichiometric ratio. As a result, carbon monoxide (CO) or hydrocarbon (HC) contained in exhaust gases from the engine can be reduced, and the amount of consumption of the fuel can be significantly reduced during an idling operation of the engine, or during a steady-state running of the vehicle on which the engine is installed. In the conventional type of internal combustion engine wherein the fuel is injected into an intake passage, the fuel-air mixture is produced inside the intake passage, thus causing a delay with which the mixture actually flows into the cylinder. In contrast, the in-cylinder injection type engine, as described above, is free from such a delay, and may be accelerated or decelerated with excellent response.

However, the advantages of the in-cylinder injection type engine, as described above, can be provided only in the case where the engine is operated with a relatively low load applied thereto. Namely, if the amount of injection of the fuel is increased with an increase in the load of the engine, the fuel-air mixture formed around the spark plug tends to be excessively rich, namely, contains an excessively high percentage of fuel, thereby making it impossible to ignite the fuel, with a result of a failure in burning the fuel. Thus, in the case of the in-cylinder injection type engine, it is difficult to form a fuel-air mixture having the optimum air-fuel ratio only in the vicinity of the spark plug, over the entire range of operating states of the engine.

To solve the above-described problem, an in-cylinder injection type engine, as disclosed in laid-open Japanese Patent Publication (kokai) No. 5-79370, has two fuel injection modes, i.e., an early injection mode in which the fuel is injected during a suction stroke, and a late injection mode in which the fuel is injected during a compression stroke. This type of engine is controlled so that the fuel injection mode is selected from the early injection mode and the late injection mode, depending upon the load of the engine. When the fuel is injected in the late injection mode, a fuel-air mixture having an air-fuel ratio that is close to the stoichiometric ratio is formed only in the vicinity of the spark plug. Therefore, the fuel can be fired or ignited even when the mixture in the cylinder as a whole is a lean fuel mixture, and the amounts of CO and HC in the exhaust gases can be reduced. Further, the amount of consumption of the fuel can be greatly reduced during idling operations of the engine or steady-state running condition of the vehicle. When the early injection mode is established, on the other hand, the fuel is injected into a cylinder during a suction stroke, and a fuel-air mixture having a homogeneous concentration can be formed in the cylinder. Since air can be utilized with high efficiency in this mode, the amount of injection of the fuel can be increased, and the output of the engine can be sufficiently increased.

In the known in-cylinder type internal combustion engine, as described above, one of the late injection mode and early injection mode is selected as the fuel injection mode, depending upon the current steady-state operating state of the engine, but the fuel injection mode is selected without considering transient operating states of the engine, such as starting, acceleration, deceleration and cold state of the engine. Accordingly, when the engine is in a certain transient operating state, the fuel injection mode or the average air-fuel ratio in the cylinder may not be appropriately selected, and the engine used in the vehicle may not be able to sufficiently perform its desired functions.

In view of the above problem, the late injection mode is forced to be established as the fuel injection mode when an accelerator pedal is depressed during fuel cut so as to resume supply of the fuel and bring the vehicle into an accelerating state, thereby preventing shocks due to acceleration of the vehicle, as disclosed in WO96/36801.

It has also been proposed in laid-open Japanese Patent Publication (kokai) No. 7-279729 to determine whether the fuel injection is resumed in the late injection mode or early injection mode, depending upon a control region selected according to the torque and fuel amount.

Where the fuel injection is resumed in the late injection mode in the in-cylinder injection type engine disclosed in either of the above publications, however, there arises a problem that an undershoot of the engine speed cannot be avoided if the engine speed is reduced by a considerably large degree.

If the engine speed is reduced when the fuel injection mode is forced to return to the late injection mode, only small torque is produced upon return to this mode due to a delay in correction of the amount of air, thus causing a problem of further reduced engine speed.

SUMMARY OF THE INVENTION

It is therefore an object of the present invention to provide a fuel injection control device of an in-cylinder injection type internal combustion engine, which control device establishes the early injection mode, without being forced to select the late injection mode, when fuel injection is resumed upon return from a fuel cut mode with the throttle valve being fully closed, thereby preventing the undershoot of the engine speed.

In a fuel injection control device of an in-cylinder injection type internal combustion engine, according to the present invention, fuel injection is resumed in a suction stroke injection mode (early injection mode), rather than a compression stroke injection mode (late injection mode), during control of return from fuel cut, when a degree of deceleration of the engine detected by engine deceleration degree detecting means for detecting a degree of deceleration of the engine is equal to or greater than a predetermined value, thereby preventing undershoot of the engine speed upon return from the fuel cut.

In one preferred form of the invention, the engine deceleration degree detecting means determines whether a deceleration of a rotating speed of the engine or engine speed is equal to or greater than a predetermined value. More specifically, the rate of reduction in the engine speed NE is calculated, and if the deceleration is equal to or greater than the predetermined value, the fuel injection is resumed in the intake stroke injection mode selected in the control of return from the fuel cut, thereby preventing undershoot of the engine speed.

In another preferred form of the invention, the engine deceleration degree detecting means determines whether an operated amount of an acceleration instructing member that is operated by a driver is equal to or smaller than a predetermined value. It is to be noted that detection of the operated state of the acceleration instructing member by the driver includes detection of the opening of the throttle valve.

DETAILED DESCRIPTION OF THE PREFERRED EMBODIMENTS

The present invention will become more fully understood from the detailed description given hereinbelow and the accompanying drawings which are given by way of illustration only, and thus are not limitative of the present invention.

Figure 1:
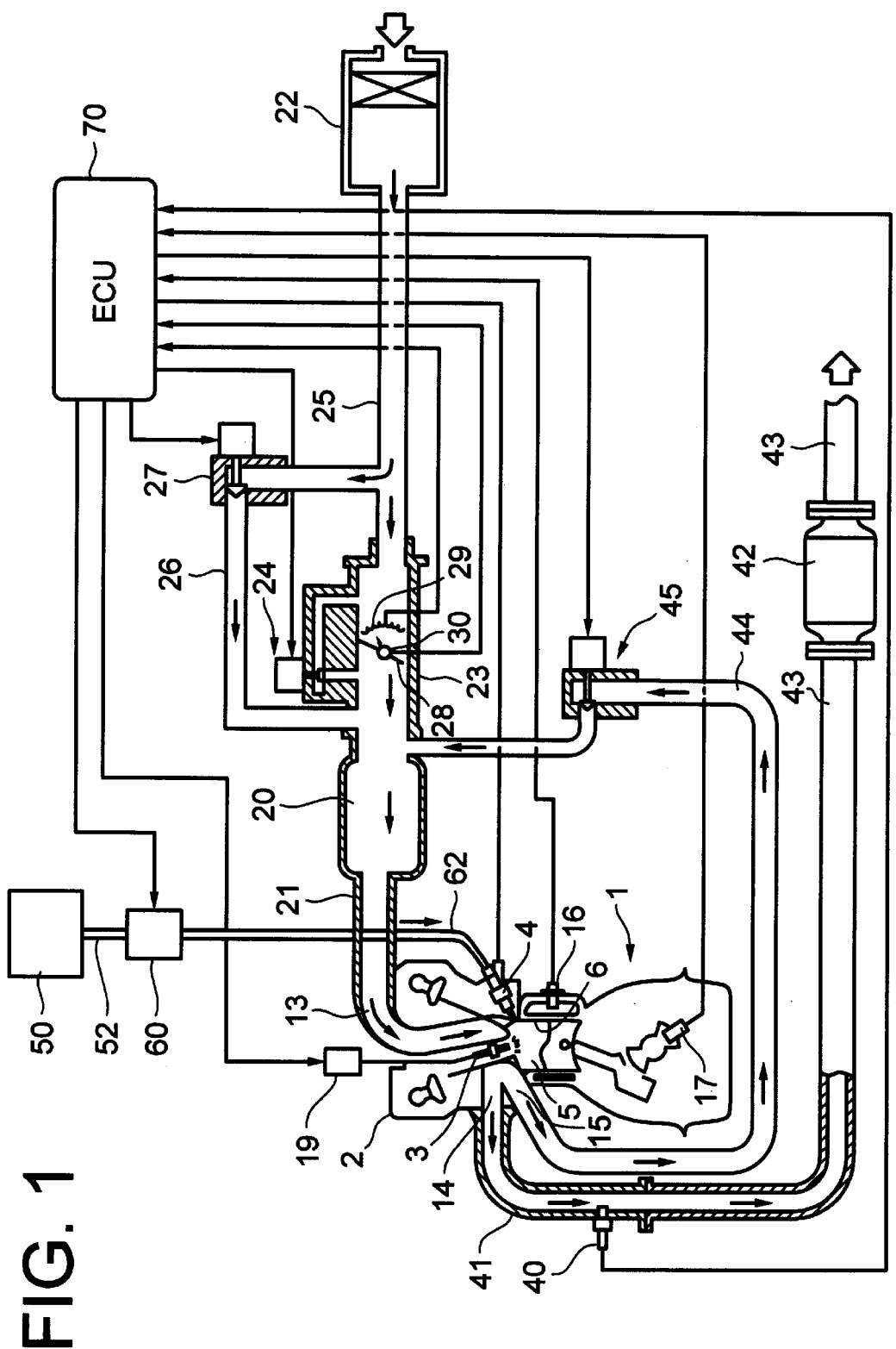
FIG. 1 is a schematic view showing the construction of an engine system.

Referring first to FIG. 1, an engine system of a motor vehicle includes a straight four-cylinder, four-cycle gasoline engine 1 (hereinafter simply called an "engine") of in-cylinder injection type. The engine 1 has a cylinder head 2, a cylinder block, and an oil pan. In the cylinder head 2, a spark plug 3 and a single-solenoid-valve type fuel injector 4 are mounted with respect to each cylinder bore 6, such that a fuel can be directly injected into a corresponding combustion chamber 5. The spark plug 3 is electrically connected to an ignition coil 19 (shown in FIG. 1), and this ignition coil 19 serves to apply a high voltage to the spark plug 3.

The cylinder head 2 has intake passages 13 each of which is formed in a substantially upright direction to be connected to a corresponding one of cylinders, and exhaust passages 14 each of which is formed in a substantially horizontal direction to be connected to a corresponding cylinder. An upstream end portion of each of the intake passages 13 is connected to an intake manifold 21, and an upstream end portion of each of the exhaust passages 14 is connected to an exhaust manifold 41. The exhaust manifold 41 is provided with an $O_2$ sensor 40.

A water temperature sensor 16 for detecting the temperature of cooling water or coolant is mounted in the cylinder block. In a crank case of the engine, an electromagnetic crank-angle sensor 17 for detecting certain crank angles (for example, 5° BTDC and 75° BTDC) is provided for each cylinder, and the engine speed NE can be detected based on signals from the crank-angle sensors 17.

The construction of the in-cylinder injection type engine 1, as described above, is already known in the art, and therefore detailed description of the engine itself will not be provided.

A throttle body 23 is connected to the intake manifold 21 via a surge tank 20, and an air cleaner 22 is connected to this throttle body 23 via an intake pipe 25. The throttle body 23 defines a valve passage that communicates the surge tank 20 with the intake pipe 25, and a throttle valve 28, in the form of a butterfly valve, is disposed in this valve passage. This throttle valve 28 is adapted to open the valve passage, depending upon the amount of depression of an accelerator pedal that is not illustrated. In addition to the valve passage, a branch passage that bypasses the throttle valve 28 is formed in the throttle body 23, and a first air bypass valve 24 is disposed in this branch passage. The first air bypass valve 24 is driven by a stepping motor (not illustrated). In addition, a throttle sensor 29 for detecting an opening degree of the throttle valve 28, i.e., throttle opening θTH, and an idle switch 30 for detecting the fully closed state of the throttle valve 29, are disposed in the throttle body 23.

A bypass pipe 26 diverges from a portion of the intake pipe 25 located upstream of the throttle body 23, such that the bypass pipe 26 communicates with the valve passage of the throttle body 23, at an end portion of the pipe 26 located on the downstream side of the throttle body 23. The bypass pipe 26 has substantially the same channel cross-sectional area as the intake pipe 25, and a second air bypass valve 27 is inserted in the middle of the bypass pipe 26. The second air bypass valve 27 consists of a linear solenoid valve.

In the cylinder head 2, EGR passages 15 diverge from the respective exhaust passages 14. These EGR passages 15 are connected to one end of the EGR pipe 44 via a manifold (not shown), and the other end of the EGR pipe 44 is connected to an upstream end portion of the surge tank 20. An EGR valve 45 is inserted in the middle of the EGR pipe 44, and this EGR valve 45 is driven by a stepping motor (not shown).

The engine system is provided with a fuel tank 50, and a fuel control device 60 is connected to this fuel tank 50 via a fuel pipe 52. The fuel control device 60 is connected to the fuel injectors 4 through fuel pipes 62. More specifically, the fuel control device 60 is provided with a low-pressure fuel pump and a high-pressure fuel pump, and is able to supply the fuel in fuel tank 50 to the fuel injectors 4 at a high pressure.

Various electric sensors, switches and devices, as described above, are electrically connected to an electronic control unit (ECU) 70. The ECU 70 is adapted to receive signals from these sensors and switches, and control operations of the devices based on these signals.

Figure 2:
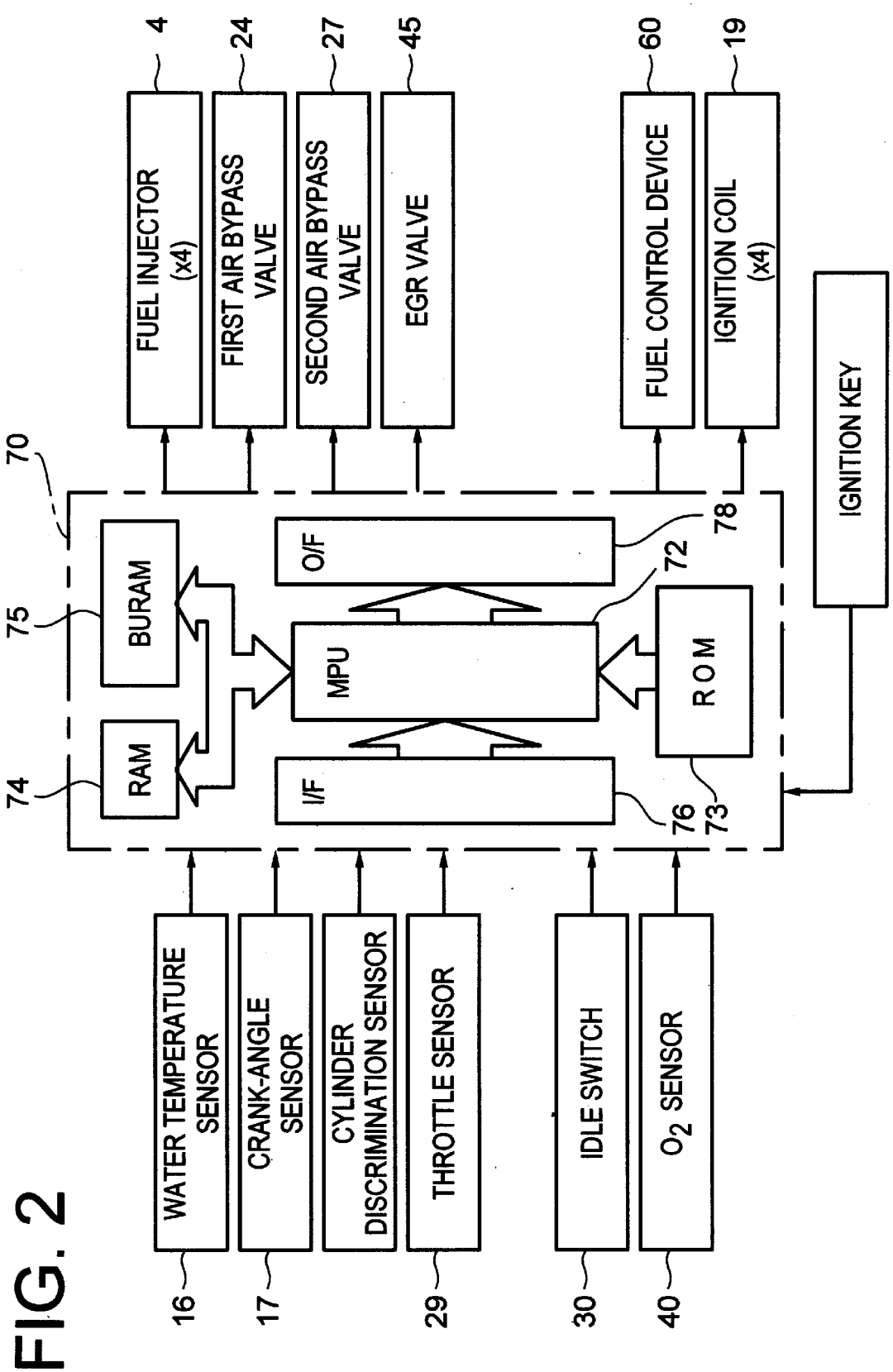
FIG. 2 is a block diagram showing various sensors, switches and control devices that are connected to ECU.

The sensors, switches, and devices that are electrically connected to the ECU 70 are illustrated in FIG. 2. The ECU 70, which is so-called a microcomputer, includes basic circuits, such as a microprocessor (MPU) 72, a read only memory (ROM) 73, a random access memory (RAM) 74, a backup memory (BURAM) 75, an input interface 72, and an output interface 76. To the input interface 72, the water temperature sensor 16, the crank-angle sensor 17, the throttle sensor 29, the idle switch 30, and the O2 sensor 40, as described above, and an airflow sensor (not shown), an intake air temperature sensor, a cylinder discrimination sensor, and an ignition key are electrically connected. To the output interface 78, the fuel injectors 4, the first air bypass valve 24, the second air bypass valve 27, the EGR valve 45, the fuel control device 60 and ignition coil 19, as described above, and various alarm lamps (not shown) are electrically connected.

The ROM 73 of the ECU 70 stores, in advance, control programs for controlling operations of the engine system, and control maps used for execution of the control programs. Upon receipt of input signals from the sensors and switches through the input interface 76, the ECU 70 determines or selects an appropriate fuel injection control mode in which both fuel injection and air-fuel ratio are controlled, based on these input signals, control programs and control maps. Then, the ECU 70 outputs control signals to suitable devices, such as the fuel injectors 4, ignition coils 19, the EGR valve 45, and the fuel control device 60, through the output interface 78, so as to control the fuel injection timing, amount of injection of the fuel, ignition timing, and EGR amount, for example.

The fuel injection control mode is selected from an early injection control mode in which the fuel is injected during a suction or intake stroke of the engine 1, and a late injection control mode in which the fuel is injected during a compression stroke of the engine 1. In controlling the air fuel ratio in the late injection control mode, the average air fuel ratio in each cylinder is controlled to a value (in the range of 20–40) that is greater than the stoichiometric ratio. The control of the air fuel ratio in the early injection control mode includes a lean control in which the average air fuel ratio in the cylinder is controlled to a value (in the range of about 20–25) that is greater than the stoichiometric ratio, stoichiometric feedback control in which the average air fuel ratio is controlled to the stoichiometric ratio, and an open-loop control in which the average air fuel ratio is controlled to be smaller than the stoichiometric ratio, namely, the percentage of the fuel contained in a mixture in the cylinder is increased. When the engine 1 operates in a cold state with a low load applied thereto, the open-loop control or stoichiometric feedback control is selected, and the average air fuel ratio in the cylinder is controlled to be in the neighborhood of the stoichiometric ratio.

Figure 3:
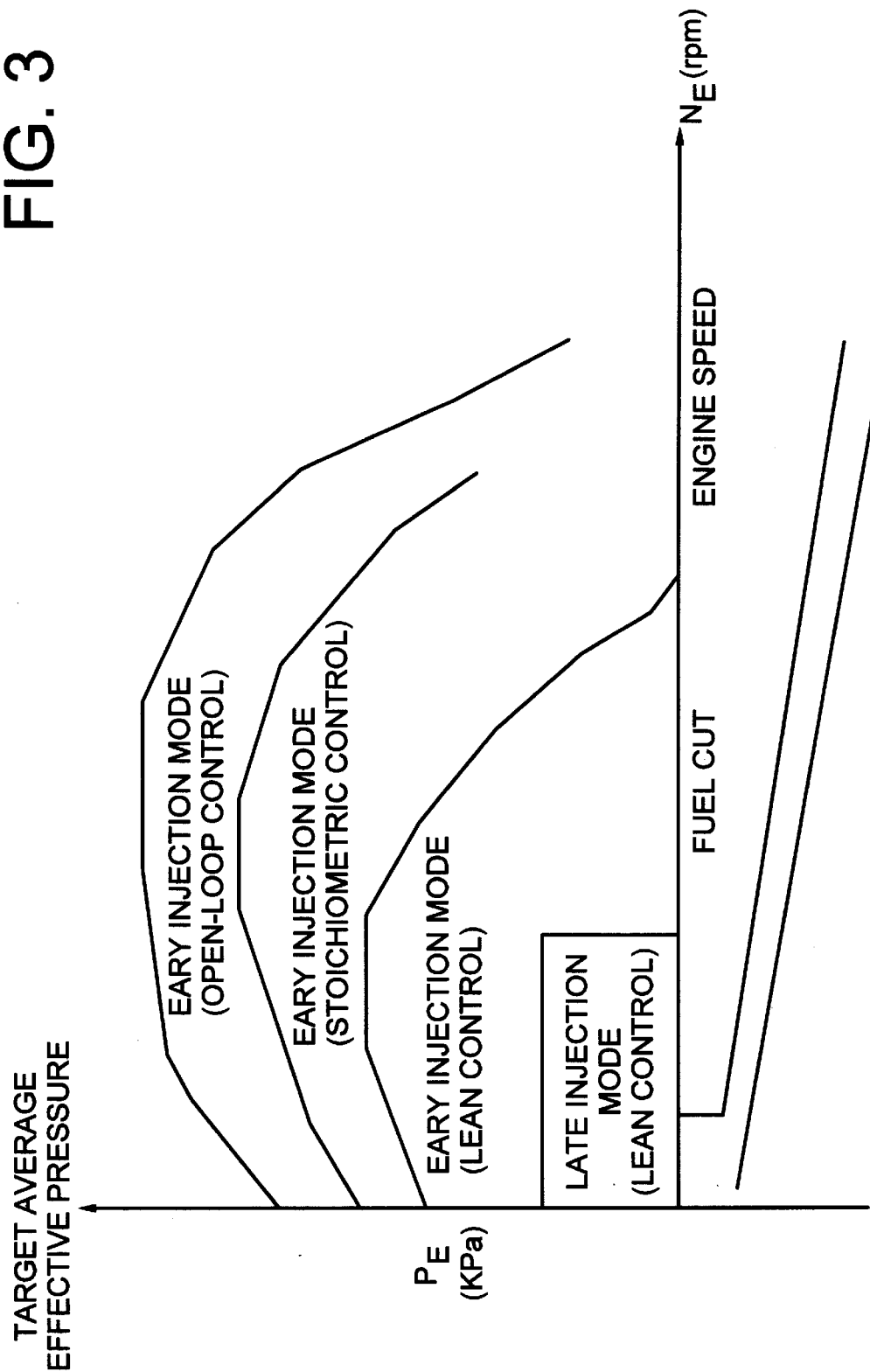
FIG. 3 is a graph showing fuel injection control modes that are established in respective control regions, depending upon operating conditions of the engine after completion of warming up of the engine.

The manner of selecting each of the fuel injection modes will be now explained. The ECU 70 determines an appropriate injection control mode in which the air fuel ratio and fuel injection timing are controlled, based on the engine speed NE, and the target average effective pressure PE as load-related information of the engine 1, and referring to a control map as shown in FIG. 3. The ECU 70 then controls opening and closing of the second air bypass valve 27 and EGR valve 45 in accordance with the thus determined injection control mode. In the present embodiment, the ECU 70 calculates the target average effective pressure PE of the engine based on the throttle opening θTH obtained from the throttle sensor 29, engine speed NE, and others, and calculates the engine speed NE based on crank-angle signals generated from the crank-angle sensors 17.

Next, the fuel injection control mode corresponding to each steady-state operating state of the engine 1 will be explained.

When the engine is in the idling state (low load and lower speed of rotation), namely, when both the engine speed NE and the target average effective pressure PE are low, the ECU 70 selects the late injection control mode (lean control) as the fuel injection control mode, as is apparent from the control map of FIG. 3. In this state, the ECU 70 controls the second air bypass valve 27 and EGR valve 45 to open these valves 27, 45. If the second air bypass valve 27 is opened, intake air is inducted through the bypass pipe 26 into the surge tank 20, irrespective of the opening of the throttle valve 28, and therefore a large amount of intake air can be supplied to each of the cylinders. Since the EGR valve 45 is also opened, a part of exhaust gases is introduced into the surge tank 20. In this case, the amount of the exhaust gases supplied to each cylinder is set to be 30–60% of the amount of the intake air. At this time, the amount of the fuel injected from the fuel injector 4 is controlled so that the average air fuel ratio in the relevant cylinder becomes equal to a value of about 20 to 40.

With the late injection mode being selected as the injection control mode, when the fuel is injected from the fuel injector 4 into the cylinder during the compression stroke, the injected fuel forms a fuel-air mixture having an air fuel ratio in the neighborhood of the stoichiometric ratio in the vicinity of the spark plug 3, just before the ignition timing, even though the average air fuel ratio in the cylinder is set to be large in this mode. Namely, since the fuel-air mixture remains close to the spark plug 3, the mixture having an air fuel ratio around the stoichiometric ratio can be formed around the spark plug 3 even if the average air fuel ratio in the cylinder is large, and the fuel mist can be ignited or fired by the spark plug 3. Thus, the engine 1 is able to perform a lean-burn operation, which leads to reduction in CO and HC in exhaust gases, and reduction in the amount of consumption of the fuel. Further, since a large amount of exhaust gases is contained in the intake air supplied to the cylinder in this case, the amount of nitrogen oxides (NOx) contained in the exhaust gases can be also significantly reduced.

When the late injection control mode is selected as the fuel injection control mode, the intake air is inducted through the bypass pipe 26 into each cylinder while bypassing the throttle valve 23. Accordingly, loop loss or pumping loss in the valve passage due to the throttle valve 23 can be reduced.

When the engine 1 operates in the idling state, it is needless to say that the amount of the fuel injected into each cylinder is increased or decreased, depending upon an increase or decrease in the engine load. With this arrangement, the idling speed of the engine 1 can be controlled to a constant value, with a considerably high response.

When the vehicle is running at a low or middle speed, the ECU 70 selects one control region from the late injection control mode (lean control) and the early injection control mode (lean control, stoichiometric control, and open-loop control), based on the target average effective pressure PE and the engine speed NE, with reference to the control map of FIG. 3.

When the vehicle is rapidly accelerated or is running at a high speed, one of the target average effective pressure PE and the engine speed NE is high, and therefore the ECU 70 establishes the early injection control mode (stoichiometric control, or open-loop control) as the injection control mode.

Next, the summary of the engine control executed by the ECU 70 during fuel cut will be provided.

If the accelerator pedal is released by the driver while the vehicle is running at a middle or high speed, the vehicle begins to decelerate, and at the same time the ECU 70 stops injection of the fuel into the cylinders (so-called fuel cut). Owing to the fuel cut, the amount of consumption of the fuel and harmful components in the exhaust gases are both reduced. If the accelerator pedal is depressed again in this state, the ECU 70 immediately terminates fuel cutting, and selects one of the control regions as described above.

Figure 4:
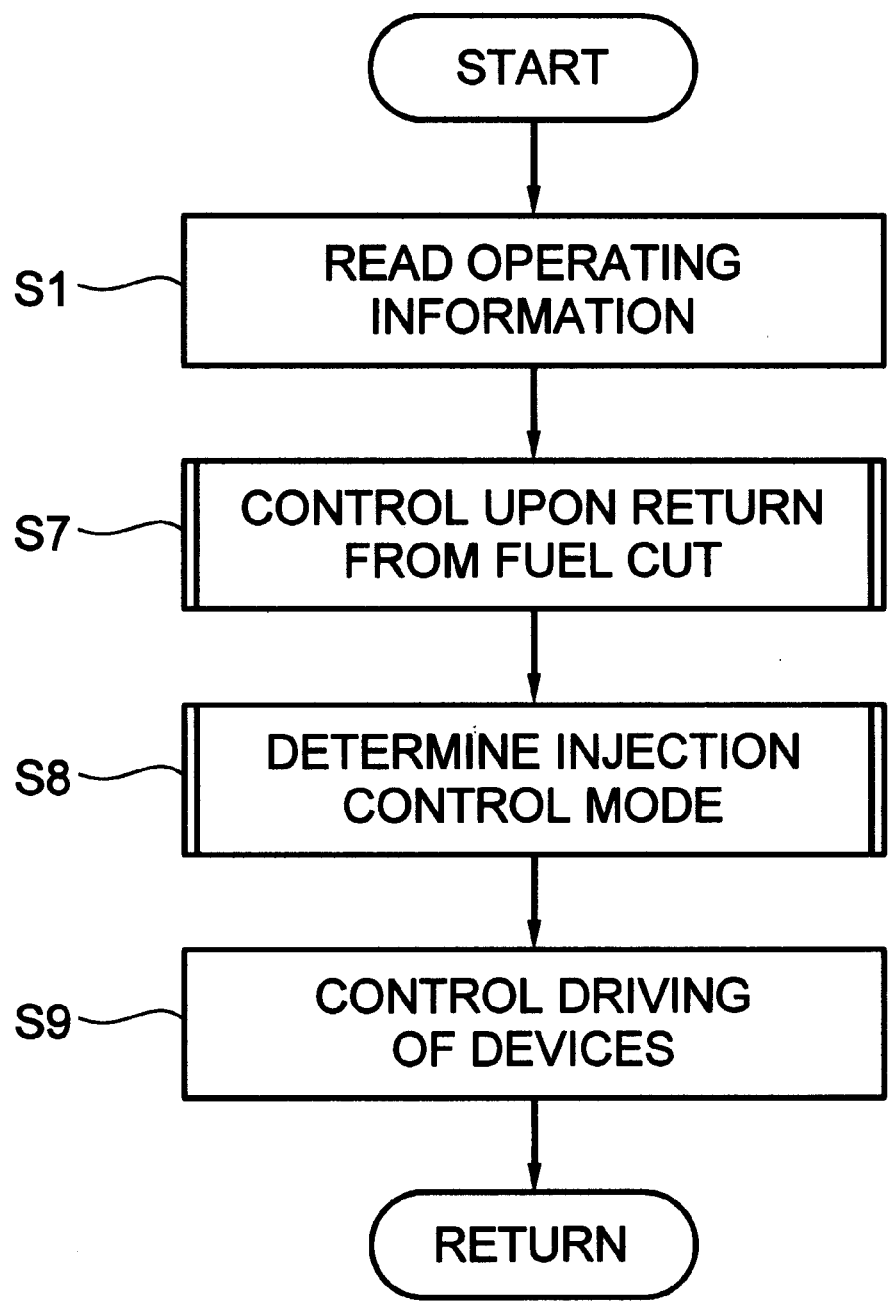
FIG. 4 is a flow chart showing a main routine for selecting a fuel injection control mode.

Next, the procedure for selecting the fuel injection control mode to be established after the fuel cut of the engine 1 will be explained. When the engine 1 is in the state of fuel cut, the fuel injection control mode is selected according to the main routine shown in FIG. 4, and this main routine is repeatedly executed at a certain cycle, for example, at every half-revolution of the engine 1, namely, each time the engine 1 undergoes one stroke.

Main Routine

In step S1, the ECU 70 reads operating information of the engine system, based on output signals from the various sensors and switches as described above. More specifically, the ECU 70 obtains the cooling water temperature TWT, throttle opening θTH, intake air temperature TAIR, and engine speed NE. The ECU 70 also calculates engine load information, such as the target average effective pressure PE, throttle opening velocity (differential value of the throttle opening) ΔθTH, and the vehicle speed V, based on the read information. Before step S1 is executed, the ECU 70 performs initialization processing, and set respective negative values to various flags and backward timer as described later.

After executing a control routine upon return from fuel cut in step S7 and a routine for determining the injection control mode in step S8 that will be described later, the ECU 70 successively executes a drive control routine in step S9 for driving devices to be controlled. In this drive control routine, the ECU 70 controls driving of various devices, such as the fuel injectors 4, first and second air bypass valves 24, 27, EGR valve 45, and ignition coils 19, based on control information determined in the previous steps.

Figure 5:
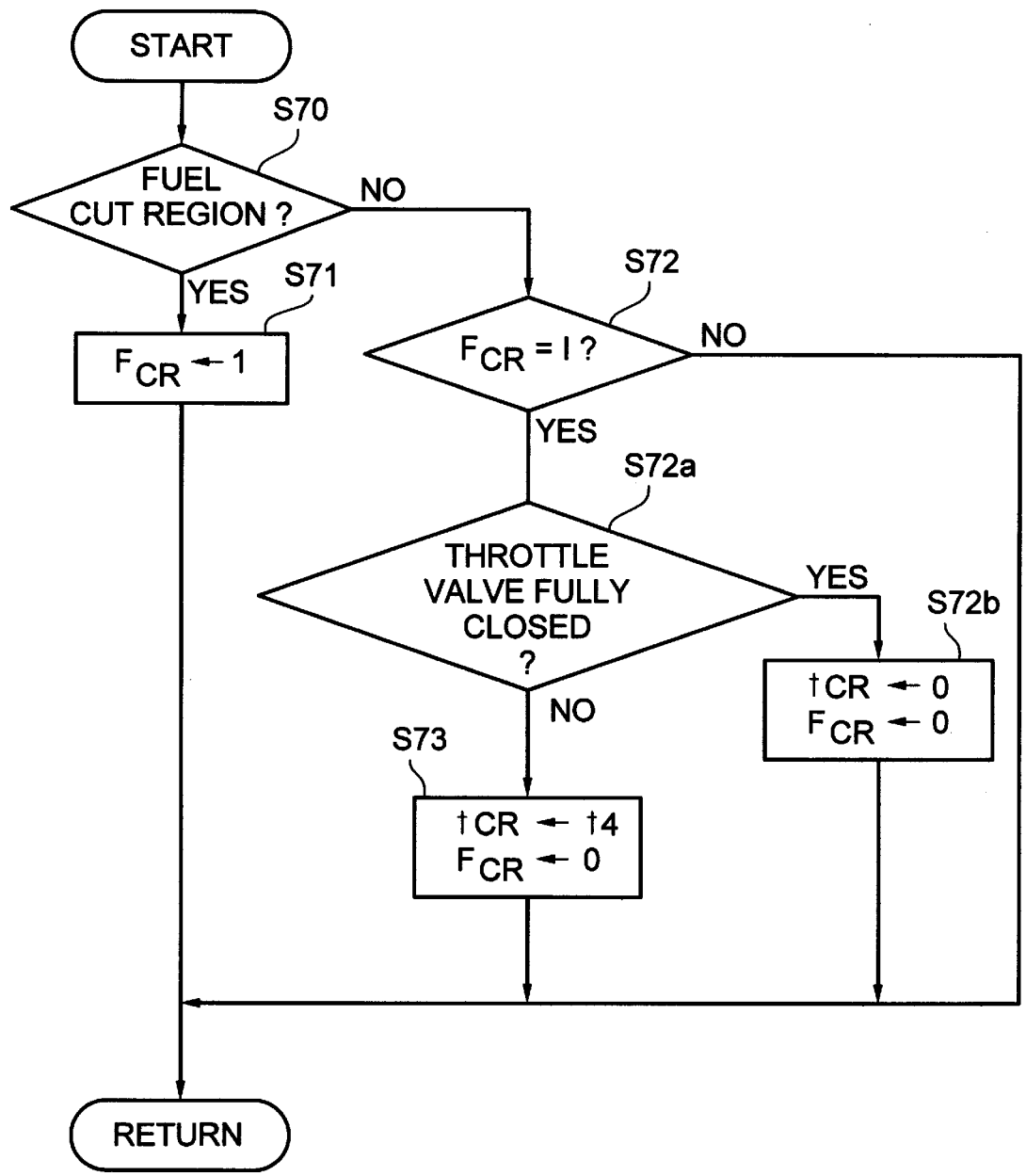
FIG. 5 is a flow chart showing in detail a control routine executed upon return from fuel cut.

In the control routine executed upon return from the fuel cut, as shown in FIG. 5, step S70 is initially executed to determine whether the control region of the engine 1 is in the fuel cut region or not, based on the target average effective pressure PE and engine speed NE. If an affirmative decision (Yes) is obtained in this step, namely, if the vehicle is being decelerated, and the control region of the engine 1 is in the fuel cut region, a return flag FCR is set to 1 in step S71.

Thereafter, if the rotating speed NE of the engine 1 (engine speed) is reduced to a return rotating speed, or the accelerator pedal is depressed by the driver so that the control region of the engine 1 leaves or comes out of the fuel cut region, a negative decision (No) is obtained in step S70, and step S72 is executed to determine whether the return flag FCR is set to 1 or not. If an affirmative decision (Yes) is obtained in step S72, namely, if the engine 1 is in the transitive state of returning from the fuel cut, it is determined in step S72a whether the throttle valve 28 is fully closed, based on a signal from the idle switch 30. The determination in this step S72a corresponds to an engine deceleration degree detecting means for detecting a degree of deceleration of the engine. In the present embodiment, this means detects or determines whether the operated amount of an acceleration instructing member, such as an accelerator pedal, is equal to or smaller than a predetermined value, for example, whether the accelerator pedal is fully released, based on a signal from the idle switch 30. Another example of the engine deceleration degree determining means that may be used in step S72a may determine whether the deceleration of the engine speed is equal to or greater than a predetermined value, and the control flow goes to step S72b if it is equal to or greater than the predetermined value, and goes to step S73 if it is less than the predetermined value.

When a negative decision (No) is obtained in step S72a, namely, when it is determined that the throttle valve 28 is not fully closed, a given value t4 (for example, 0.5 sec) is set to the backward timer tCR, and the return flag FCR is set to 0 (step S73).

While the backward time tCR is in operation, the ECU 70 is forced to select the late injection control mode as the injection control mode, as described later. In the late injection control mode selected in this case, the air fuel ratio is controlled based on the target average effective pressure PE and the engine speed NE. Thus, the rotating speed of the engine, when returning from fuel cut, can be set to a low value, assuring an improved fuel consumption.

If an affirmative decision (Yes) is obtained in step S72a, namely, if it is determined that the throttle valve 28 is fully closed, the backward time tCR is reset to 0, and the return flag FCR is set to 0 (step S72b). Namely, where the throttle valve 28 is fully closed, the backward timer tCR is reset, so that the ECU 70 is not forced to select the late injection control mode as the injection control mode, namely, the ECU 70 is caused to select the early injection control mode, thereby avoiding undershoot of the engine speed.

Figure 6:
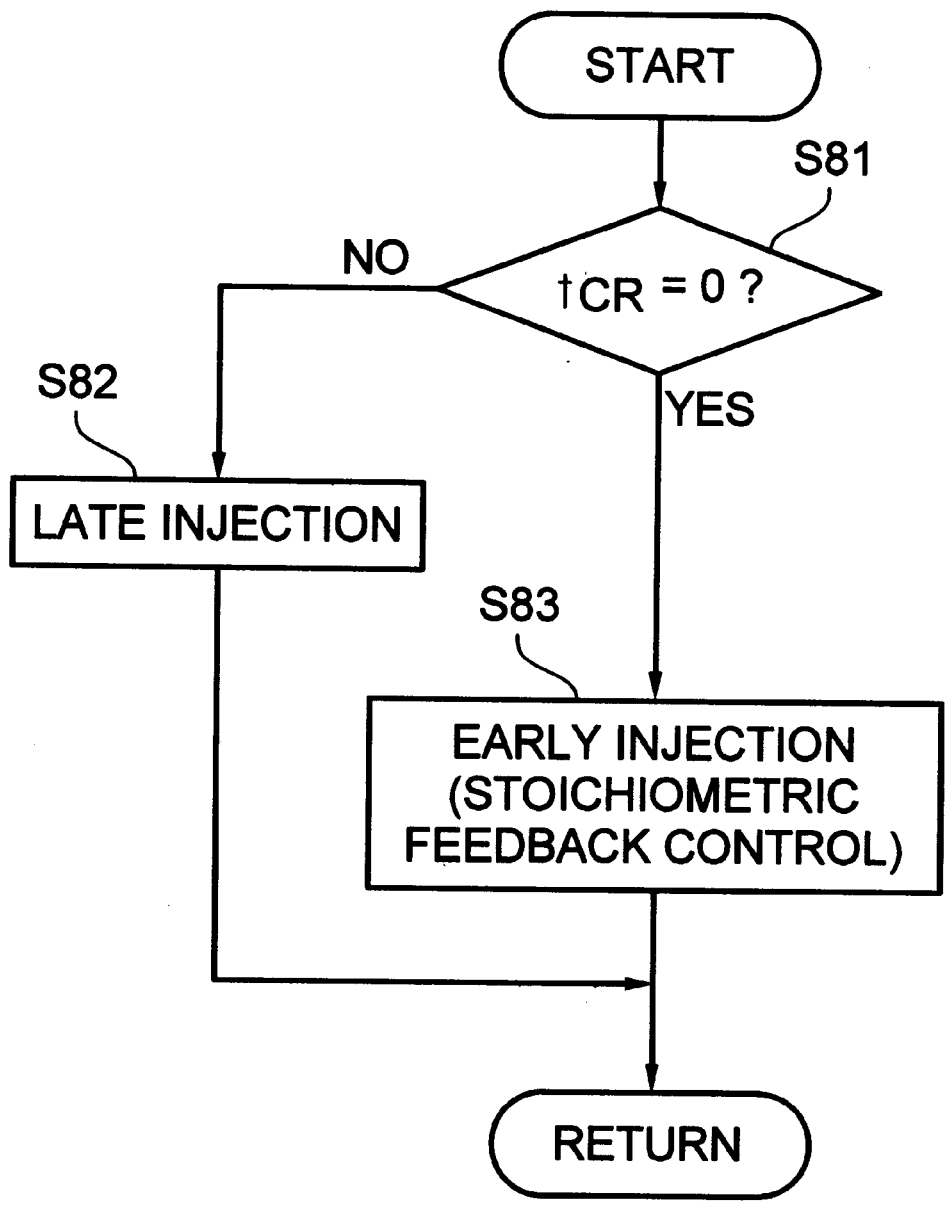
FIG. 6 is a flow chart showing in detail a routine for determining a fuel control mode.

In the routine for determining the injection control mode as shown in FIG. 6, the fuel injection control mode is determined according to the values of the flag and backward timer tCR that were set in the routine as described above.

Initially, step S81 is executed to determine whether the current value of the backward timer tCR is equal to 0 or not. A negative decision (No) is obtained in step S81, namely, when the backward timer tCR is in operation, the fuel injection control mode is outside of the fuel cut region under a condition that the backward time tCR is in operation, as is apparent from the above explanation regarding the control routine for return from fuel cut, and a control routine for dealing with deceleration shocks. In this case, step S82 is executed to cause the fuel to be injected in the late injection control mode. Since the fuel is injected in the late injection control mode while the backward timer tCR is in operation, the output of the engine 1 is prevented from being rapidly increased, and rolling of the engine 1, or vibrations of the vehicle body, can be reduced.

When an affirmative decision (Yes) is obtained in S72a in the above-described routine, namely, when it is determined that the throttle valve 28 is fully closed, the backward timer tCR is reset to 0 in step S72b, and therefore the late injection (lean control) forced in step S82 is not conducted.

When the throttle valve 28 is fully closed at the time of return from fuel cut, therefore, the late injection (lean control) forced in step S82 is not conducted, but the fuel is injected in the early injection control mode (stoichiometric feedback control) that is established in step S83. Thus, where the throttle valve 28 is fully closed upon return from the fuel cut, the early injection control mode is established, thereby preventing undershoot of the engine speed.

In the routine for determining the injection control mode, as described above, the fuel injection control mode is determined on the basis of the value of the backward timer tCR that has been set in the routine executed upon return from the fuel cut, whereby the driving comfort of the vehicle can be further improved.

Figure 7:
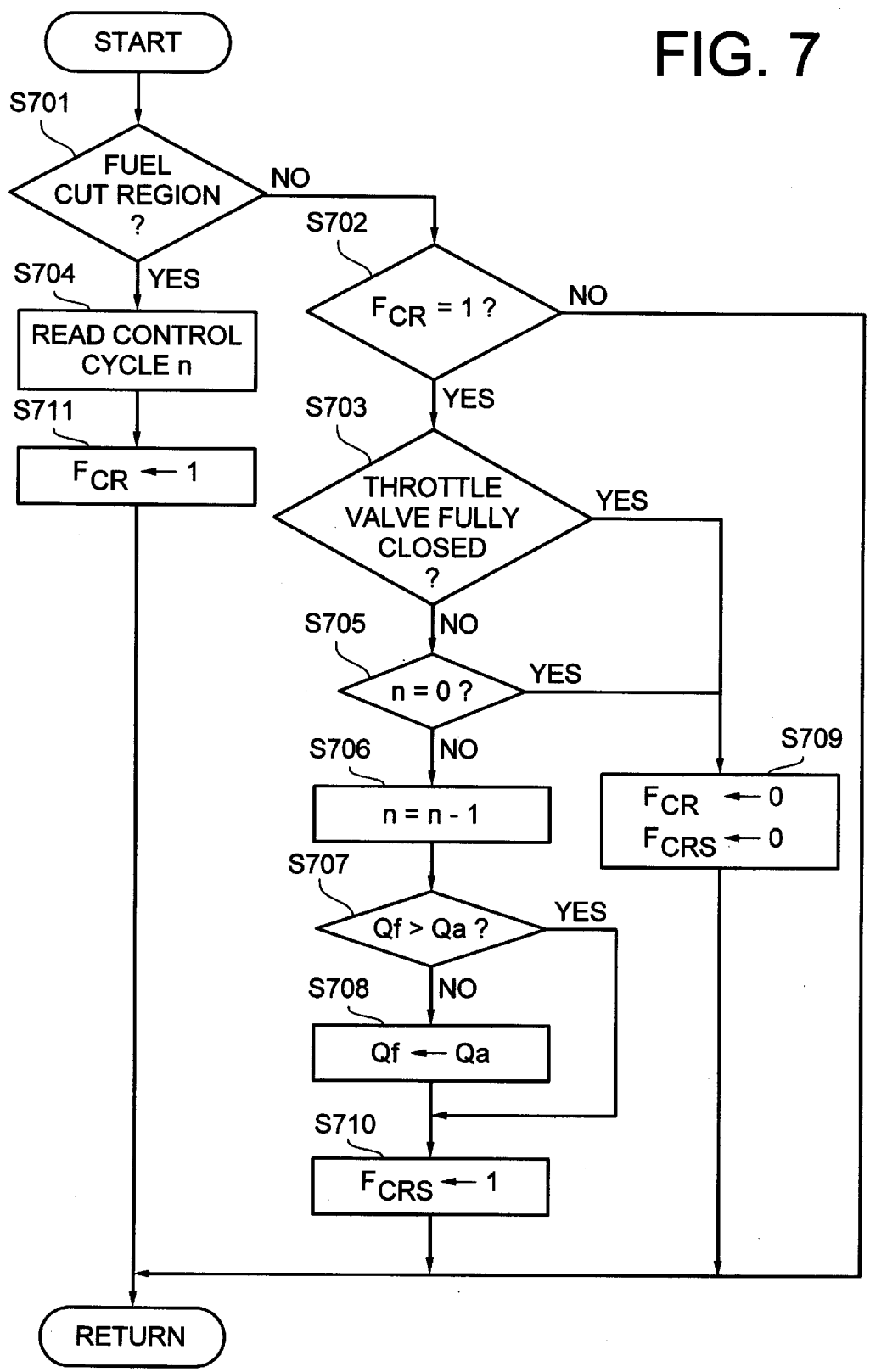
FIG. 7 is a flow chart showing a modified example of the return control routine.
Figure 8:
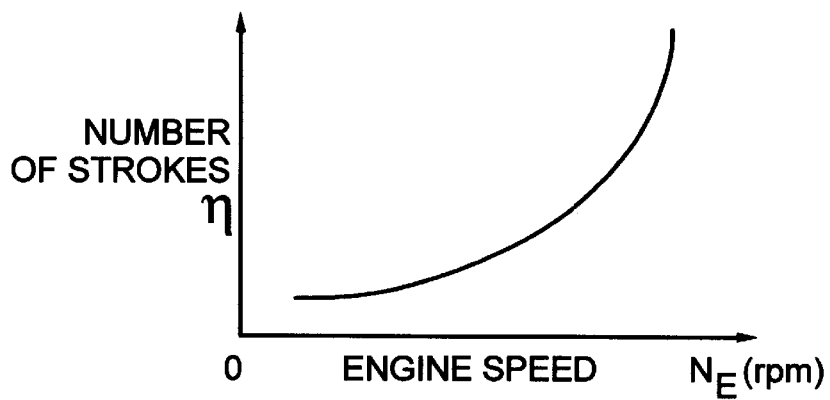
FIG. 8 is a graph showing the relationship between the engine speed and the number of strokes.

The present invention is not limited to the embodiment as illustrated above, but may be otherwise embodied with various changes or modifications. For instance, FIG. 7 shows a modified example of the control routine executed upon return from fuel cut. In the return control routine of the modified example, when an affirmative decision (Yes) is obtained in step S701, which corresponds to the above-described step S70, step S704 is executed to read in the number of strokes "n" of the engine 1 (where "n" is integer). More specifically, the number "n" is read based on the engine speed NE, with reference to the map shown in FIG. 8. As is apparent from the map of FIG. 8, the number of strokes "n" is increased with an increase in the engine speed NE.

In step S711, the return flag FCR is set to 1. Namely, the number of strokes n is repeatedly read from the map of FIG. 8 as long as the fuel injection control mode is in the fuel cut region, and the value of the return flag FCR is kept at 1.

If a negative decision (No) is obtained in step S701, on the other hand, step S702 is executed to determine whether the return flag FCR is equal to 1 or not. If an affirmative decision (Yes) is obtained in this step S702, namely, where the fuel injection control mode leaves the fuel cut region, step S703, which corresponds to the above-described step S72a of FIG. 5, is executed to determine whether the throttle valve 28 is fully closed. If a negative decision (No) is obtained in step S703, step S705 is then executed to determine whether the number of strokes "n" is equal to 0 or not. Since a negative decision (No) is obtained at this time (when step S705 is initially executed), the number of strokes "n" is reduced only by one in step S706. In the next step S707, it is determined whether the amount of injection of the fuel Qf is larger than a predetermined value Qa. In this step, the amount of injection of the fuel Qf is determined based on the air fuel ratio control of the control region selected from the map of FIG. 3. The predetermined value Qa represents the amount of injection of the fuel needed for maintaining the average air fuel ratio in each cylinder at a certain air fuel ratio (for example, 20) that is relatively larger than the stoichiometric ratio. This predetermined value Qa is determined based on the target effective pressure PE and the engine speed NE.

If an affirmative decision (Yes) is obtained in step S707, the amount of injection of the fuel Qf is kept at the current value. If a negative decision (No) is obtained in step S707, on the other hand, the control flow goes to step S708 to replace the amount of injection of the fuel Qf by the predetermined value Qa. In the next step S710, a return start flag FCRS is set to 1.

If an affirmative decision (Yes) is obtained in step S703, or if an affirmative decision (Yes) is obtained in step S705 after step S706 is repeatedly executed, the return flag FCR and return start flag FCRS are both set to 0. As a result, a negative decision (No) is obtained in step S702 in the next control cycle, and step S705 and following steps are skipped.

Figure 9:
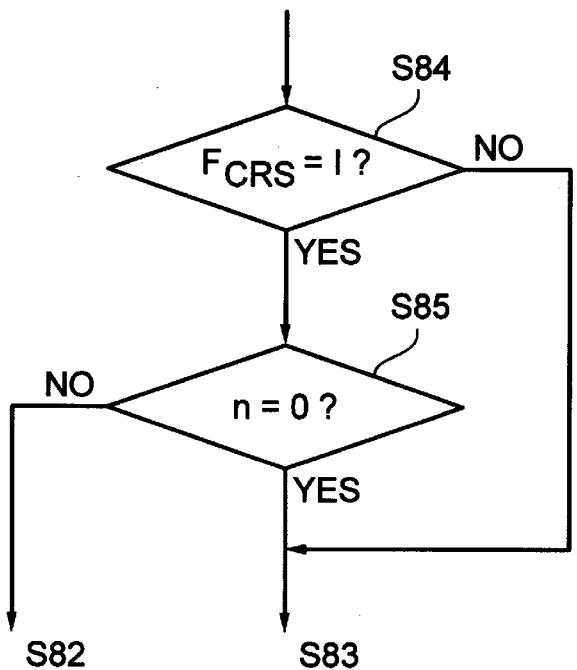
FIG. 9 is a view showing a modified part of the injection control mode determining routine of FIG. 6 when the return control routine of FIG. 7 is executed.

When the return control routine of FIG. 7 as described is executed, instead of the return control routine of FIG. 5, step S81 of the injection control mode determining routine of FIG. 6 is replaced by steps S84 and S85 shown in FIG. 9. Initially, step S84 is executed to determine whether the return start flag FCRS is 1 or not, and step S85 is then executed to determine whether the number of strokes "n" is equal to 0 or not. If an affirmative decision (Yes) is obtained in step S84, and a negative decision (No) is obtained in step S85, it means that the current control region of the engine 1 is outside the fuel cut region. In this case, the above-described step S82 of FIG. 6 is repeatedly executed until the number of strokes "n" becomes 0, and the fuel injection control mode is forced to be set to the late injection control mode.

In the return control routine and injection control mode determining routine of the modified example as described above, when the control region of the engine 1 leaves the fuel cut region, the fuel injection control mode is set to the late injection control mode during the period up to the point of time when the number of strokes "n" becomes 0. Accordingly, the output of the engine 1 is prevented from being rapidly increased, and shocks due to acceleration of the vehicle and vibrations of the vehicle body can be reduced. Where the accelerator pedal is depressed by a large amount, and the control region of the engine 1 leaves the fuel cut region, the early injection control mode (stoichiometric feedback control or open-loop control) is selected as the fuel injection control mode, with a result of a rapid increase in the amount of injection of the fuel. Even with this result, the amount of injection of the fuel Qf is limited by the predetermined value Qa, and therefore the output of the engine 1 is prevented from being rapidly increased.

Further, since the number of strokes "n" is increased as the engine speed NE is increased, the number of control cycles (n) to be executed is set to a large value, namely, the control cycle is executed an increased number of times, if the control region of the engine 1 leaves the fuel cut region while the engine speed NE is high. In this situation, the substantial period of time in which the return control routine is executed is increased, whereby variations in the output torque of the engine can be reduced. Where the throttle valve 28 is fully closed, on the other hand, the late injection control mode is not selected, so as to prevent undershoot of the engine speed.

The present invention is not limited to the embodiments as illustrated above, but may be embodied with various modifications or changes. For example, this invention is not limitedly applied to a straight four engine, but may be applied to various in-cylinder injection type engines having different number and arrangement of cylinders, including a single-cylinder engine, V-shaped six-cylinder engine, and so on. While gasoline is used as a fuel in the illustrated embodiment, the present invention is not limited to gasoline engines, but may be applied to engines using methanol as a fuel. The idling state of the engine 1 may be detected using an output signal from the idle switch 30.

A boost sensor for detecting an intake pressure in a surge tank may be used in place of the airflow sensor, and a single air bypass valve may be used in place of the air bypass valves 24, 27. When the throttle valve is driven by an electric motor, the opening of the throttle valve may be controlled so that the throttle valve itself functions as an air bypass valve. In this case, a sensor for detecting the amount of depression of the accelerator pedal is used in place of the throttle opening sensor.

In the return control routine of FIG. 7, the number of strokes "n" is used instead of the value of the backward timer. The number of strokes "n" may also be used in other control routines, in place of backward timers used in the control routines. Also, the initial value set by a backward timer of each control routine may be changed in accordance with the engine speed NE.

Further, various predetermined values, as described above, are not limited to those values as indicated above, but may be suitably determined depending upon specifications of the whole system including the engine.

While step S72a in the illustrated embodiment determines whether the throttle valve 28 is fully closed or not, during the control of return from fuel cut as shown in FIG. 3, a determination as to whether the degree of reduction of the engine speed is greater than a predetermined value may be made between step S72 and step S72a, and step S72a is executed in the case where the degree of reduction of the engine speed is determined to be greater than the predetermined value.

In the above case, if it is determined that the engine speed is reduced by a large degree, and the throttle valve 28 is fully closed, the engine speed is expected to be further reduced, and therefore the early injection mode is selected, instead of the late injection mode forced to be selected in step S82.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control device for an in-cylinder injection internal combustion engine, comprising:

injection mode selecting means for selecting one of a compression stroke injection mode, in which fuel injection is conducted during a compression stroke, and a suction stroke injection mode, in which fuel injection is conducted during a suction stroke, depending upon operating conditions of the engine;

fuel cut means for cutting a fuel to be supplied to a combustion chamber of the engine when a fuel cut condition is established, said fuel cut condition being set depending upon the operating conditions of the engine;

return control means for resuming fuel injection in the compression stroke injection mode when a predetermined fuel cut return condition is established; and engine deceleration degree detecting means for detecting a degree of deceleration of the engine, wherein said return control means resumes the fuel injection in the suction stroke injection mode when the degree of deceleration of the engine detected by said engine deceleration degree detecting means satisfies a predetermined condition.

2. A fuel injection control device according to claim 1, wherein said engine deceleration degree detecting means determines whether a deceleration of a rotating speed of the engine is equal to or greater than a predetermined value.

3. A fuel injection control device according to claim 1, wherein said engine deceleration degree detecting means determines whether an operated amount of an acceleration instructing member that is operated by a driver is equal to or smaller than a predetermined value.

4. A fuel injection control device according to claim 2, wherein said return control means resumes the fuel injection in said suction stroke injection mode when said deceleration of the rotation speed of the engine is equal to or greater than said predetermined value.

5. A fuel injection control device according to claim 3, wherein said return control means resumes the fuel injection in said suction stroke injection mode when the operated amount of the acceleration instructing member operated by the driver is equal to or smaller than the predetermined value.

6. A fuel injection control device according to claim 1, wherein said return control means resumes the fuel injection in said suction stroke injection mode when the detected degree of deceleration of the engine is equal to or greater than a predetermined value, and in said compression stroke injection mode when the detected degree of deceleration of the engine is smaller than said predetermined value.

7. A fuel injection control device according to claim 6, further comprising:

a backward timer for counting a predetermined period of time, said backward timer being set when the detected degree of deceleration of the engine is smaller than said predetermined value, wherein said return control means resumes the fuel injection in said compression stroke injection mode until said predetermined period of time elapses, and injects fuel in said suction stroke injection mode thereafter.

8. A fuel injection control device according to claim 6, further comprising:

a counter for counting a number "n" of strokes of the engine when engine is running in said fuel cut condition, and decrementing the counted number "n" when the engine is running outside said fuel cut condition, where said "n" is an integer, wherein said return control means resumes the fuel injection in said compression stroke injection mode until said counted number "n" is decremented to "0," and injects fuel in said suction stroke injection mode thereafter.

* * * * *

UNITED STATES PATENT AND TRADEMARK OFFICE
CERTIFICATE OF CORRECTION

PATENT NO. : 6,003,489
DATED : Dec. 21, 1999
INVENTOR(S) : Kamura et al.

It is certified that error appears in the above-identified patent and that said Letters Patent is hereby corrected as shown below:

Column 12, line 33, after "elapses" insert --.--

Column 12, lines 33 and 34, delete ", and injects fuel in said suction stroke injection mode thereafter".

Column 12, line 41, after "condition" insert --thereafter and when the detected degree of deceleration of the engine is smaller than said predetermined value--.

Column 12, lines 44 and 45, change "0," to read "0." and delete "and injects fuel in said suction stroke injection mode thereafter."

UNITED STATES PATENT AND TRADEMARK OFFICE
CERTIFICATE OF CORRECTION

PATENT NO. : 6,003,489
DATED : Dec. 21, 1999
INVENTOR(S) : Kamura et al.

It is certified that error appears in the above-identified patent and that said Letters Patent is hereby corrected as shown below:

Column 12, line 46, add the following new claims 9-10 as follows:

--9. A fuel injection control device for an in-cylinder injection internal combustion engine, comprising:
  injection mode selecting means for selecting one of a compression stroke injection mode, in which fuel injection is conducted during a compression stroke, and a suction stroke injection mode, in which fuel injection is conducted during a suction stroke, depending upon operating conditions of the engine;
  fuel cut means for cutting a fuel to be supplied to a combustion chamber of the engine when a fuel cut condition is established, said fuel cut condition being set depending upon the operating conditions of the engine;
  return control means for resuming fuel injection in the compression stroke injection mode when a predetermined fuel cut return condition is established; and
  acceleration instructing amount detecting means for detecting an operated amount of an acceleration instructing member that is operated by a driver,
  wherein said return control means is caused to resume fuel injection in the suction stroke injection mode when the operated amount of the acceleration instructing member detected by the acceleration instructing amount detecting means is equal to or smaller than a predetermined value and when the predetermined fuel cut return condition is established.--

UNITED STATES PATENT AND TRADEMARK OFFICE
CERTIFICATE OF CORRECTION

Page 3 of 3

PATENT NO. : 6,003,489
DATED : Dec. 21, 1999
INVENTOR(S) : Kamura et al.

It is certified that error appears in the above-identified patent and that said Letters Patent is hereby corrected as shown below:

--10. A method for controlling an in-cylinder injection internal combustion engine, comprising:
    selecting one of a compression stroke injection mode, in which fuel injection is conducted during a compression stroke, and a suction stroke injection mode, in which fuel injection is conducted during a suction stroke, depending upon operating conditions of the engine;
    cutting a fuel to be supplied to a combustion chamber of the engine when a fuel cut condition is established, said fuel cut condition being set depending upon the operating conditions of the engine;
    resuming fuel injection in the compression stroke injection mode when a predetermined fuel cut return condition is established; and
    detecting a degree of deceleration of the engine,
    wherein fuel injection in the suction stroke injection mode is resumed when the degree of deceleration of the engine satisfies a predetermined condition.--

Signed and Sealed this

Twenty-third Day of January, 2001

Attest:

Q. TODD DICKINSON

*Attesting Officer*     *Commissioner of Patents and Trademarks*